(12) United States Patent
Bobrov et al.

(10) Patent No.: US 7,031,053 B2
(45) Date of Patent: Apr. 18, 2006

(54) DICHROIC POLARIZER AND MATERIAL

(75) Inventors: Yuri A. Bobrov, Moscow (RU); Leonid Y. Ignatov, Moscow (RU); Pavel I. Lazarev, Belmont, CA (US); Alla Y. Sakharova, Belmont, CA (US)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 09/792,524

(22) Filed: Feb. 23, 2001

(65) Prior Publication Data

US 2001/0029638 A1 Oct. 18, 2001

(51) Int. Cl.
*G02B 5/30* (2006.01)
*G02B 27/28* (2006.01)
(52) U.S. Cl. ............ 359/352; 359/491; 359/490; 359/492; 359/500; 252/585; 252/589; 349/194
(58) Field of Classification Search ............ 359/485, 359/490, 491, 492, 500, 494, 352; 252/585, 252/589; 349/194
See application file for complete search history.

(56) References Cited

U.S. PATENT DOCUMENTS

| | | | |
|---|---|---|---|
| 5,007,942 A | | 4/1991 | Claussen et al. |
| 5,073,014 A | | 12/1991 | Ostoja-Starzewski |
| 5,089,906 A | * | 2/1992 | Ohnishi et al. |
| 5,142,393 A | * | 8/1992 | Okumura et al. |
| 5,381,253 A | * | 1/1995 | Sharp et al. |
| 5,506,706 A | * | 4/1996 | Yamahara et al. |
| 5,693,446 A | * | 12/1997 | Staral et al. |
| 5,783,120 A | * | 7/1998 | Ouderkirk et al. |
| 5,867,316 A | * | 2/1999 | Carlson et al. |
| 6,049,428 A | * | 4/2000 | Khan et al. ............ 359/491 |
| 6,064,457 A | * | 5/2000 | Aminaka |
| 6,084,651 A | * | 7/2000 | Yamahara et al. |
| 6,137,556 A | * | 10/2000 | Yamahara |
| 6,188,455 B1 | * | 2/2001 | Yamamoto |
| 6,297,906 B1 | * | 10/2001 | Allen et al. |
| 6,563,640 B1 | * | 5/2003 | Ignatov et al. |

FOREIGN PATENT DOCUMENTS

| | | |
|---|---|---|
| EP | 0 676 652 A2 | 11/1995 |
| WO | WO 94/28073 | 12/1994 |
| WO | WO95/17691 | * 6/1995 |
| WO | WO96/16015 | * 5/1996 |

* cited by examiner

*Primary Examiner*—Ricky D. Shafer
(74) *Attorney, Agent, or Firm*—Dorsey & Whitney LLP

(57) ABSTRACT

The invention pertains to thermo-resistant and light-resistant dichroic polarizers based on thin films of dichroic matters, in particular organic dyestuffs, in which molecules are ordered in a crystalline structure and applied on the surface of the substrate. The dichroic polarizer is characterized by the fact that it contains at least one anisotropically absorbing film comprised of oriented molecules. Anisotropically absorbing film is characterized by the fact that for the major axes of the ellipsoids of the real and imaginary parts of anisotropic refraction coefficient in the range of at least one absorption band of the following is true on the area with linear dimensions no less than the maximum wavelength:

$$K_1 \geq K_2 > K_3$$

$$\frac{(n_1 + n_2)}{2} > n_3$$

where $K_1$, $K_2$, $K_3$ and $n_1$, $n_2$, $n_3$, are main values of the semiaxes of the ellipsoid representing the imaginary and real parts, accordingly, of the anisotropic refraction coefficient, and/or the anisotropically absorbing film is characterized by the fact that light transmission by two films with cross-oriented polarization axes does not increase at least in some range of wavelengths upon the deviation of its propagation from the normal to the polarizer plane.

24 Claims, 8 Drawing Sheets

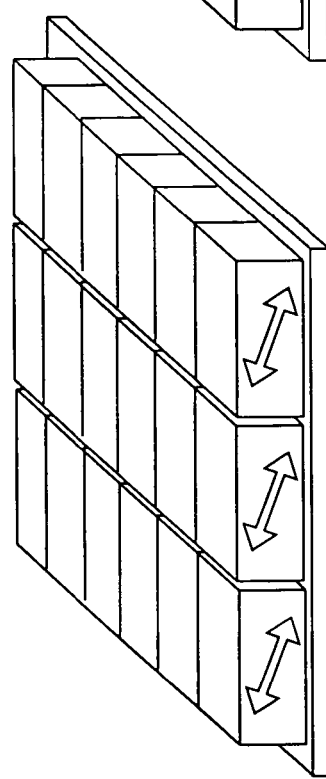
Fig. 5
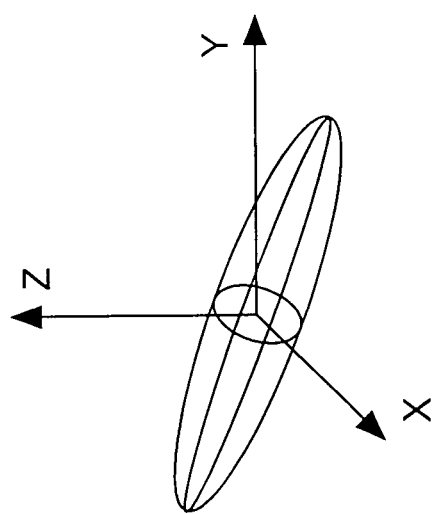
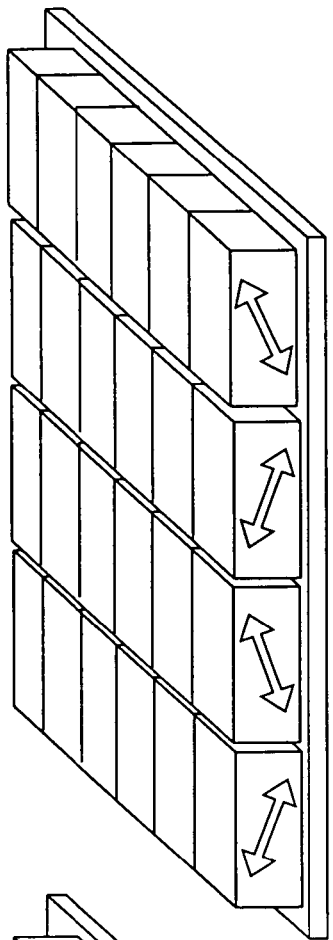
Fig. 6
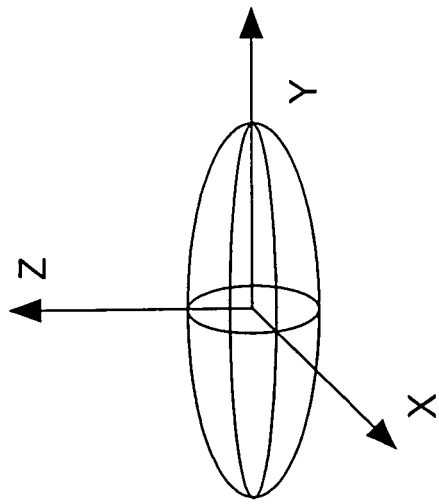

DICHROIC POLARIZER AND MATERIAL

FIELD OF THE INVENTION

The invention pertains to thermo-resistant and light-resistant dichroic polarizers, which are based on thin films of dichroic organic matters, in particular organic dyestuffs applied onto the surface of the substrate, dichroic molecules of which are ordered into a crystalline structure. The polarizers of the present invention can be used in applications with severe operating conditions. A wide application area includes but is not limited to for example, liquid crystal displays.

BACKGROUND OF THE INVENTION

Optical polarizing films have found wide use in a variety of industries. Many polarizers have been investigated and there are polarizers based on polymers, for example polyvinyl alcohol, which are made optically anisotropic by uniaxial stretching of a thin film of such polymer. The onset of optical anisotropy is due to stretching of the polymer molecules and their subsequent orientation along the direction of stretching as described in U.S. Pat. No. 5,007,942.

Upon exposure to iodine vapor, iodine-containing solution or an organic dyestuff, the film is colored. The intensity of the color depends on the direction of the electric field vector of the electromagnetic wave E relative to the axis of stretching.

The polarizing efficiency of such films is determined by the concentration of iodine or other dyestuff in the polymer film and the degree of orientation of the polymer molecules.

Despite the high polarizing efficiency of polarizers obtained from currently commonly used materials, they have a substantial disadvantage in that two cross-oriented polarizers have a high transmittance of light incident at an azimuth angle, especially at azimuth of ±45° relative to the axis of polarization.

Another prior art polarizer is based on sulfo-acids of aso- and polycyclic compounds or their mixtures as well as their salts as described in WO 94/28073. Solution of the known material can form a stable lyotropic liquid-crystal phase, which allows manufacturing of optically anisotropic films. In order to obtain a film based on this known material, the lyotropic liquid-crystal dyestuff is applied and oriented on the substrate. The solvent is later vaporized and a thin film of ordered molecules remains on the substrate. The structure of the film is comprised of ordered complexes of flat molecules of the known material. The planes of molecules and their dipole moments of optical transition are oriented perpendicular to the axis of macroscopic orientation in the film. Creation of such structure makes use of the liquid-crystal condition of the dyestuff where the molecules are already locally oriented, while existing in one- or two-dimensional quasi-crystal groups, oriented relative to each other. Upon application of such structure along with the simultaneous external alignment force, it assumes macroscopic orientation, which will not only remain, but could also improve due to the effect of crystallization during drying process. The resultant axis of polarization is along the direction of the application.

Polarizers based on this material have a number of disadvantages, which limit its applicability. In particular, it has insufficient polarizing efficiency and low angular characteristics. This results in the fact that when used in various devices, which use two parallel polarizers of herein described type, there is some undesirable transmittance of unpolarized light incident at an angle to their surface. This effect is especially prominent when one of the polarizers has diffuse-reflective coating, which is used in most of liquid-crystal displays. One of the reasons of the above disadvantages is the fact that there is no control over the degree of absorption along the normal to the plane of the polarizer. Therefore the ratio of the coefficients of absorption along the two axes, one of which lays in the plane of the substrate and perpendicular to the direction of the orientation and the other coincides with the normal to the substrate, is not optimized. Accordingly, it is desirable to provide improved polarizers.

SUMMARY OF THE INVENTION

The present invention provides an improved dichroic polarizer and material for its manufacture. More specifically, the invention provides dichroic polarizers which are based on thin films of dichroic organic materials, in particular organic dyestuffs applied onto the surface of a substrate, and the dichroic molecules are ordered into a crystalline structure.

In one aspect the present invention provides a dichroic polarizer containing at least one anisotropically absorbing film of oriented molecules of an organic material, wherein the anisotropically absorbing film is characterized in that for the semimajor axes of the ellipsoids of the real and imaginary part its anisotropic refractive index in the range of at least one band of absorption wavelengths, the following relationship is satisfied on the area with dimensions of no less than the maximum wavelength of at least one absorption band:

$$K_1 \geq K_2 > K_3$$

$$\frac{(n_1 + n_2)}{2} > n_3$$

where $K_1$, $K_2$, $K_3$, $n_1$, $n_2$ and $n_3$ are main values of the imaginary and real part, respectively, of the semiaxis of the ellipsoid representing the anisotropic refractive index. Further, the anisotropically absorbing film may be characterized in that light transmission of two anisotropically absorbing films with cross-oriented polarization axes does not increase with the angle of incidence at least for a certain range of wavelengths in case of the deviation of its propagation from the normal to the polarized plane.

In another aspect of the present invention, it provides a material of the anisotropically absorbing film based on oriented molecules of an organic material wherein the molecules are oriented so that for the semimajor axes of the ellipsoids of the real and imaginary parts of anisotropic refractive index in the range of at least one band of absorption wavelengths, the following relationship is satisfied on the area with linear dimensions of no less than the maximum wavelength of at least one absorption band:

$$K_1 \geq K_2 > K_3$$

$$\frac{(n_1 + n_2)}{2} > n_3$$

where $K_1$, $K_2$, $K_3$, $n_1$, $n_2$ and $n_3$ are the main values of the imaginary and real part, respectively, of the semiaxes of the ellipsoid representing the anisotropic refractive index. Further, the molecules may be oriented so that light transmission of two anisotropically absorbing films with cross-oriented polarization axes, formed with this material, does not increase, at least in some range of wavelengths, upon deviation of the direction of light propagation from the normal to the polarizer.

BRIEF DESCRIPTION OF THE DRAWINGS

The invention will be more clearly understood from the following detailed description when read in conjunction with the accompanying drawings in which:

FIGS. 5 through 9 illustrate various embodiments of molecular packing in a polarizer of the present invention, which provide the necessary anisotropy of the absorption coefficient.

DETAILED DESCRIPTION OF THE PRESENT INVENTION

Figure 1:
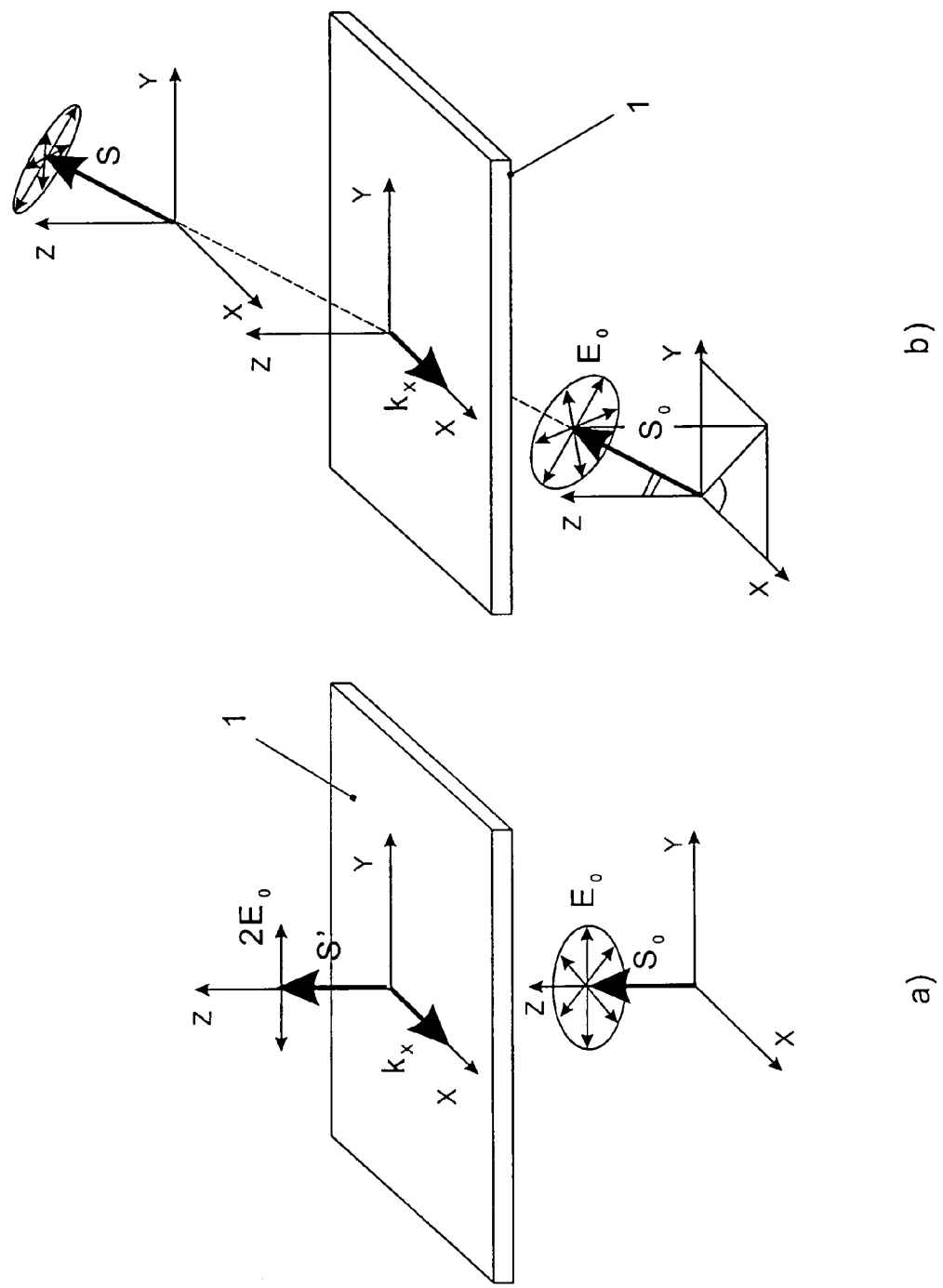
FIGS. 1a and 1b are diagrams illustrating the permeation of incident light perpendicularly and at an angle to the plane of the polarizers in the case of an ideally oriented single-axis polarizer.

The present invention is now described in detail and with reference to the figures.

Optical properties of polarizers are characterized by the complex anisotropic refractive index $N_{i,j}=\sqrt{\epsilon_{i,j}\cdot\mu_{ii,j}}$, where $e_{i,j}$ and $\mu_{i,j}$ are tensors of dielectric and magnetic transmittance. In the system of coordinates, in which the tensor of the dielectric transmittance is diagonal, $N_m=n_m-i\cdot k_m$, where $n_m$ is the refractive index, which characterizes the speed of light in the matter and the plane of polarization of which is parallel to the axis m, $k_m$ is an imaginary part, which characterizes absorption of light with the plane of polarization along axis m and related to the absorption coefficient as follows:

$$K_m = 2\pi\cdot k_m/\lambda,$$

where λ is the light wavelength. Angular dependence of the real and imaginary parts of the refractive index may be described with ellipsoids.

Iodine polarizers are characterized by the axial symmetry of components of $N_m$. Here major axis of the ellipsoid coincides with the direction of stretching. Also, the two components of the real and imaginary parts of the refractive index are equal, while the refractive index of the ordinary ray is less than the refractive index of the extraordinary ray, and the two components of the imaginary part are close to zero. Such films have the so-called positive dielectric anisotropy and positive dichroism. This means that the dipole moments of the optical transition of molecules, which are responsible for the absorption of light, are oriented along the direction of polymer stretching. In the case of the opposite type of ratio between refractive indices of the ordinary and extraordinary rays, in particular, in the case when refractive index of the ordinary ray is greater than the refractive index of the extraordinary ray, and the two components of the imaginary part are equal to some finite value, while the third is equal to zero, the film is said to have negative single-axis dichroism and dielectric anisotropy. Therefore, in the first case the ellipsoids of the angle dependence of the real and imaginary parts of the refractive index have extended (needle-like) form, and in the second case disk-like form.

Variations in the form of the ellipsoid of the imaginary part of the refractive index substantially affect parameters of polarizers, particularly their angular characteristics. The inventors have determined that for the large value of the refractive index along the normal axis $K_z$, comparable with coefficient $K_y$ along the Y axis, which is perpendicular to the direction of the orientation, the polarizer has relatively low polarizing efficiency and low transmittance with two parallel oriented polarizers, especially if one of them has diffuse-reflective coating, which is prevalent in the most of liquid-crystal displays. This particular situation is characteristic to the polarizer according the present invention. This is related to the fact that the intensity of absorption of unpolarized light incident at an angle increases for all directions of polarization plane in the incident beam. On the other hand, when the value of $K_z$ is small, transmittance of light incident at an angle by the two cross-oriented polarizers is too large because of the decrease in degree of light polarization exiting the first polarizer. We empirically determined the particular relationship between the main axes of the ellipsoids of the real and imaginary parts of the anisotropic refractive index of the anisotropically absorbing film and/or the dependence of the transmittance by a two cross-oriented anisotropically absorbing films, manufacturing of which will make possible to attain the described bellow technical result and could be reliably controlled on its various stages.

Of particular advantage, the present invention provides enhancement of the angular characteristics of the polarizer, and further the decrease of transmittance of unpolarized light by a single as well as by two parallel oriented polarizers while retaining their original thickness, and enhancement of angular characteristics of the two cross-oriented polarizers and an increase of polarizing efficiency.

This result is attained because of the fact that in a dichroic polarizer, which contains at least one anisotropically absorbing film of oriented molecules of an organic material or matter, the anisotropically absorbing film is characterized by the fact that for the main axes of the ellipsoids of the real and imaginary part of its anisotropic refractive index in the range of at least one band of absorption wavelengths, the following is true on the area with dimensions of no less than the maximum wavelength of at least one absorption band:

$$K_1 \geq K_2 > K_3$$

$$\frac{(n_1 + n_2)}{2} > n_3$$

where $K_1$, $K_2$, $K_3$ and $n_1$, $n_2$, $n_3$, are main values of the imaginary and real part, accordingly, of the axes of the ellipsoid representing the anisotropic refractive index, and/or the anisotropically absorbing film is characterized by the fact that the light transmission of two films with cross-oriented polarization axes, does not increase upon diversion of direction of propagation from the normal to the polarizer, for at least a certain wavelength range.

The following relation of the absorption coefficients is possible:

$K_1 \geq K_2 \gg K_3$ $K_3 < 0.2 * K_1$

Directions, which correspond to the maximum and/or minimum value of the imaginary part of refractive index, can lay in the plane parallel to the plane of the substrate.

In one embodiment the organic matter or material is constituted by at least one organic substance, chemical formula of which has at least one ionogenic group, which provides solubility in polar solvents in order to create the lyotropic liquid-crystal phase, and at least one counterion, which in the process of formation of the anisotropically absorbing film either remain in the structure of the molecules or not.

In another embodiment the organic matter is constituted by at least one organic substance, chemical formula of which contains at least one non-ionogenic group, which provides solubility in non-polar solvents in order to create the lyotropic liquid-crystal phase, which in the process of formation of the anisotropically absorbing film either remain in the structure of the molecules or not.

In yet another embodiment, the organic matter is constituted by at least one organic dyestuff capable of light absorption in at least one of the following spectral ranges: from 200 through 400 nm, or 400 through 700 nm, or from 0.7 through 13 µm.

In a further embodiment, the organic matter is constituted by at least one organic dyestuff of the formula:

{K}(M)n where K is the dyestuff having a chemical formula of which contains ionogenic group or several groups, same or different, which provide its solubility in polar solvents in order to form lyotropic liquid-crystal phase, M is a counterion, and n is the number of counterions in a dyestuff molecule, which could be a fraction in the case of sharing of one counterion by several molecules, and in the case of n>1 counterions could be different.

The anisotropically absorbing film of the present invention in one embodiment is formed by a multitude of supra-molecular complexes of one or several organic matters, where the supra-molecular complexes are uniformly oriented to provide polarization of the incident light.

At least one of the anisotropically absorbing films may be obtained from a solution of at least one organic matter, which forms a stable lyotropic or thermotropic liquid-crystal phase, via application of such solution onto an isotropic or anisotropic surface of the substrate or a structure, application of an external alignment force and subsequent drying process.

Polarizer can have the substrate made out of either a polymer, glass, metal or semiconducting material, surface of which could be either flat, convex, concave, conical, cylindrical or varying according to a certain law, including periodic. The surface of the substrate as well as its volumetric properties could be isotropic and anisotropic. The texture on the surface of the substrate could be formed periodic as well as non-periodic.

Polarizer could contain at least one polarizing film, and/or at least one film of conducting material, and/or at least one phase-shifting film, and/or at least one birefringent film, and/or at least one alignment (the liquid crystal) film, and/or at least one protective film, and/or at least one film of liquid crystal, and/or at least one diffuse- or mirror-reflecting film, and/or at least one film simultaneously functioning as two or more of the above films, while at least one of those films could be anisotropically or isotropically absorbing and/or birefringent.

The technical result is also attained because of the fact that the molecules of the material of the anisotropically absorbing film are oriented so that for the main axes of the ellipsoids of the real and imaginary parts of anisotropic refractive index in the range of at least one band of absorption wavelengths, the following is true on the area with dimensions of no less than the maximum wavelength of at least one absorption band:

$K_1 \geq K_2 > K_3$ $$\frac{(n_1 + n_2)}{2} > n_3$$

where $K_1$, $K_2$, $K_3$ and $n_1$, $n_2$, $n_3$, are main values of the imaginary and real part, accordingly, of the axes of the ellipsoid representing the anisotropic refractive index, and/or the molecules of the material are oriented so that the transmission of light by two films with cross-oriented polarization axes made of the same material does not increase upon diversion of direction of propagation from the normal to the polarizers, for at least a certain wavelength range.

The following relation of the absorption coefficients is possible:

$K_1 \geq K_2 \gg K_3$ $K_3 < 0.2 * K_1$

In one embodiment the organic matter is constituted by at least one organic substance, chemical formula of which has at least one ionogenic group, which provides its solubility in polar solvents in order to create the lyotropic liquid-crystal phase, and at least one counterion, which in the process of formation of the anisotropically absorbing film either remain in the structure of the molecules or not.

In another embodiment the organic matter is constituted by at least one organic substance, chemical formula of which has at least one non-ionogenic group, which provides solubility in non-polar solvents in order to create the lyotropic liquid-crystal phase, which in the process of formation of the anisotropically absorbing film either remain in the structure of the molecules or not.

In a further embodiment the organic matter is constituted by at least one organic dyestuff capable of absorption in at least one of the following spectral ranges: from 200 through 400 nm, or 400 through 700 nm, or from 0.7 through 13 µm.

The organic matter could also be based on at least one organic dyestuff of the formula {K}(M)n where K is the dyestuff, chemical formula of which contains ionogenic group or several groups, same or different, which provide its solubility in polar solvents in order to form lyotropic liquid-crystal phase, M is a counterion, and n is the number of counterions in a dyestuff molecule, which could be a fraction in the case of sharing of one counterion by several molecules, and in the case of n>1 counterions could be different.

Water could be used as the polar solvent.

The material may be formed by a multitude of supra-molecular complexes of one or several organic matters, where the supra-molecular complexes are uniformly oriented to provide polarization of the incident light.

The material maybe obtained from a solution of at least one organic substance, which forms a stable lyotropic or thermotropic liquid-crystal phase, via application of such solution onto an isotropic or anisotropic surface of the substrate or a structure, application of an external alignment force and the subsequent drying process.

The material can be intended for, and is not limited to, obtaining a polarizing film, and/or a phase-shifting film, and/or a birefringent film, and/or an alignment (the liquid crystal) film, and/or a protective film, and/or a film of liquid crystal, and/or a film simultaneously functioning as any combination of at least two or more of the above films.

The material may further be characterized by the varying direction of the polarization axis throughout the thickness of the film, obtained from this material, on at least a single area of the film.

Referring to FIG. 1a, a beam of unpolarized light $S_0$ hits the surface along the normal to the surface of the polarizer 1, axis of absorption of which is along the X direction, which coincides with the direction of stretching of the polymer film. The absorption coefficient along that axis is equal to $K_x$, while along Y and Z it is zero. Axis Z is pointing along the normal to the plane, while Y coincides with the axis of polarization. The light of the unpolarized beam $S_0$ contains flat polarized rays with arbitrary polarization in all possible orientations and equal amplitude of the electrical field $E_0$, therefore the tips of the E vectors are on the circumference of radius $E_0$. In the case of the normal incidence, the circumference of the incident beam transforms into a straight line of length $2E_0$ of the exiting beam S', which signifies transformation of the light into a flat polarized beam.

If the incident light beam is deviated at an intermediate azimuth angle, as shown in FIG. 1b, then the flat polarized beam transforms into partially polarized, since the portion of rays with the plane of polarization perpendicular to the axis of absorption will pass through the polarizer unaffected (without attenuation). The other rays will be attenuated to a various degree depending on the angle between their orientation and the polarization axis. Therefore, the beam S', exiting the polarizer will only be partially polarized and the degree of polarization will be minimal when the azimuth angle is 45°. The circumference, on which lay the tips of the E-vectors will be transformed into an ellipsoid with the main axis equal to $E_0$. Upon the beam passing through the second polarizer, axis of polarization of which is parallel to the polarization axis of the first polarizer, only the minor axis of the ellipsoid will be affected due to additional absorption. The semimajor axis will remain the same. If the polarization axis of the second polarizer is perpendicular to the first one, then the major axis of the ellipsoid will be attenuated, while the minor axis will remain the same and the resultant beam on the exit from the second polarizer will be poorly polarized. The intensity of this resultant beam is increasing with the increasing polar angle $\Omega$ and with the azimuth angle $\Phi$ closer to 45°. This illustrates the poor angular characteristics of cross-oriented polarizers with positive anisotropy.

Figure 2:
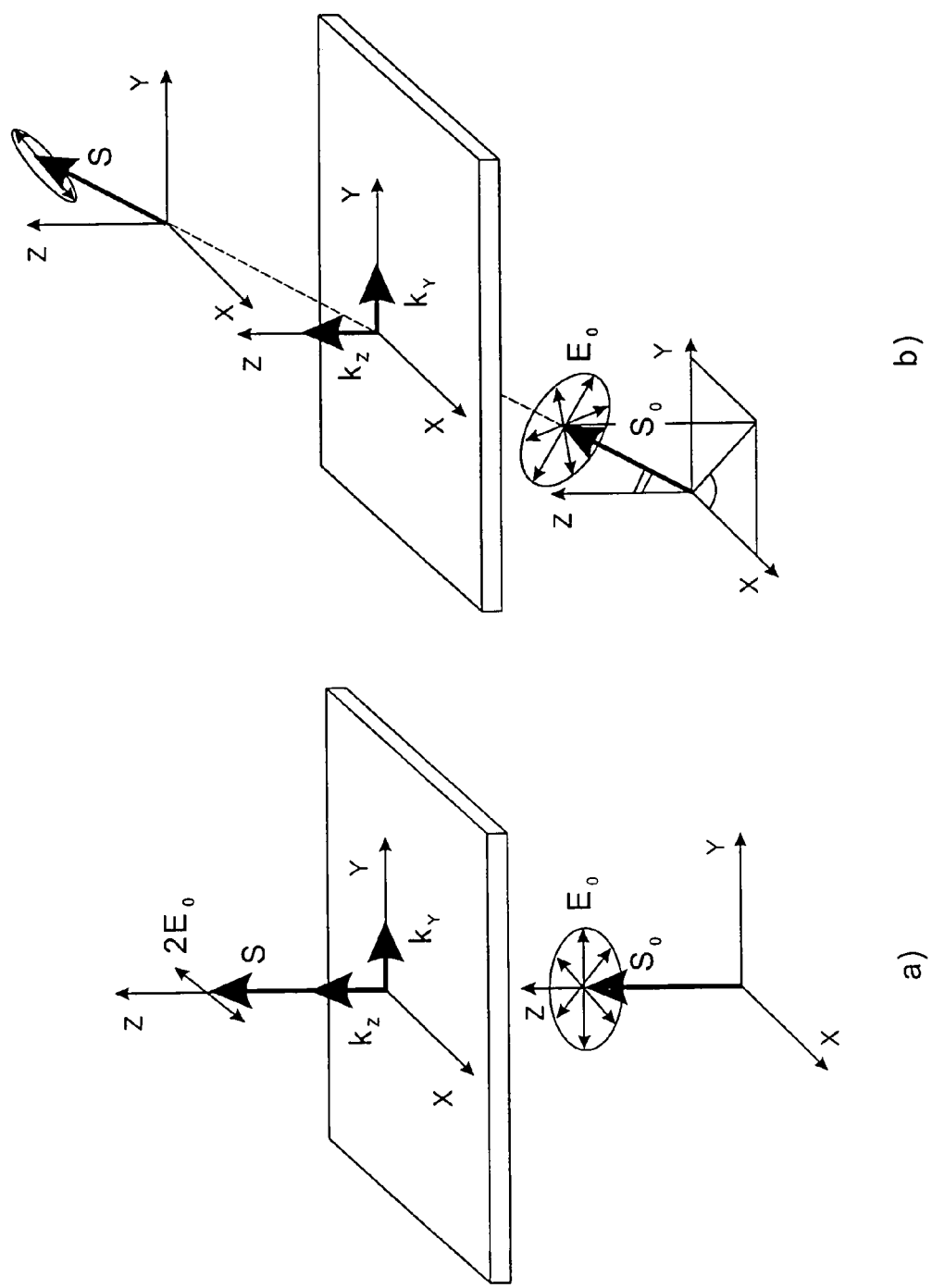
FIGS. 2a and 2b provide an analogous illustration for a polarizer, absorption coefficient of which along the normal is equal to the absorption coefficient perpendicular to the direction of orientation and the third coefficient is equal to zero.

In the case of distributed dipole moments of the optical transition, shown in FIG. 2, the circumference of the unpolarized light incident normal to the polarizer also transforms into a straight line of length $2E_0$. With the deviation of the beam $S_0$ from the normal, the polarized beam S' will also be transformed into an ellipse, however the semimajor axis will be less than $E_0$ since in the inclined beam there are no E-vectors that would be perpendicular to all absorbing dipoles. Upon passing through the second polarizer parallel to the first one, both axis of the ellipse will decrease even further and the resultant light has the intensity even less than if all the dipole moments were oriented in one single direction as in the first case. If the light passes through two cross-oriented polarizers than absorption of light in all directions of E-vector increases, which provides a more complete absorption of light in comparison to the case illustrated in FIGS. 1a and 1b.

Therefore, for two polarizers of any type, having an advantage in angle characteristics in one orientation corresponds to a disadvantage in the other orientation. From the above analysis we conclude that the magnitude of the absorption coefficient along the normal to the polarizer plane substantially affects the angular characteristics of polarizers. Consequently, it is possible to pick such a ratio of $K_y$ and $K_z$ that would provide the optimum combination of characteristics of polarizers with positive and negative dichroism.

Figure 3:
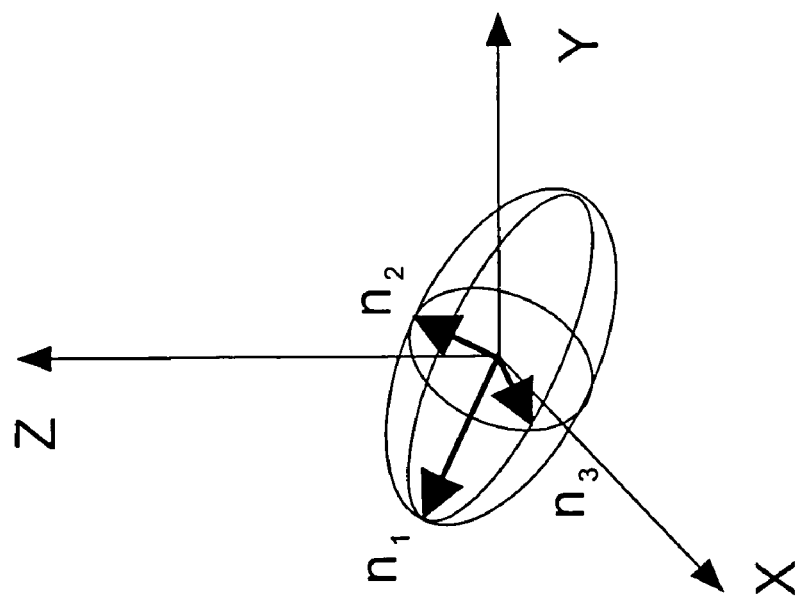
FIG. 3 shows the ellipsoids, which characterize the angular dependence of the absorption coefficient in the polarizer according to the present invention.
Figure 3:
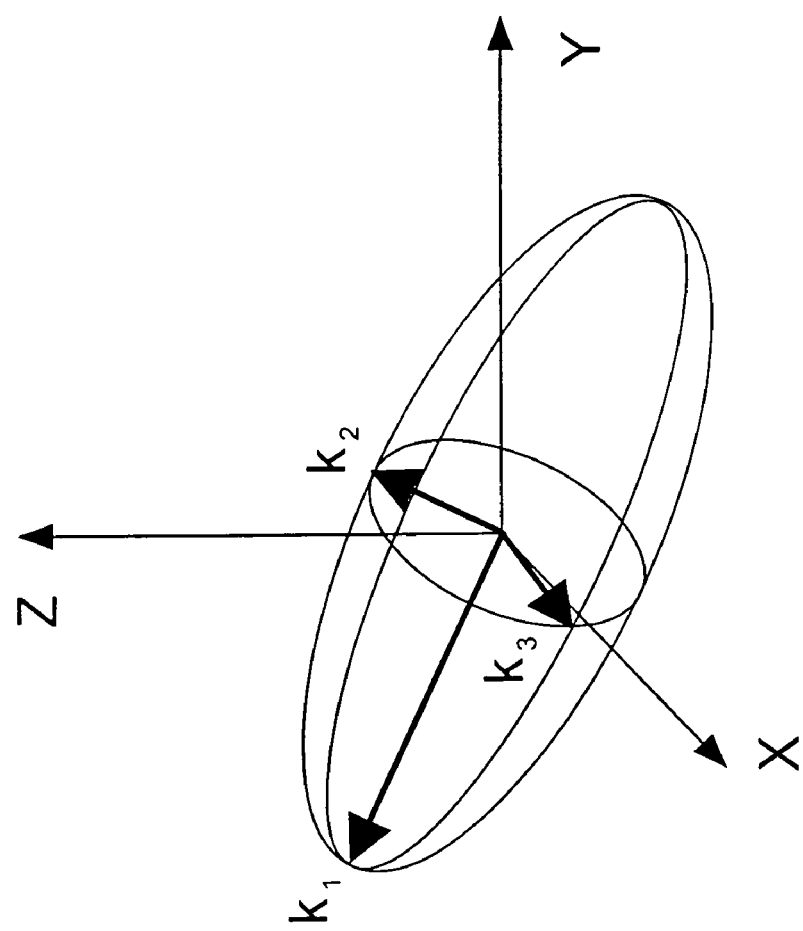

FIG. 3 shows ellipsoids, which characterize the angular dependence of the refraction and absorption coefficients (real and imaginary parts of the anisotropic refractive index) of the proposed polarizer. The main axes of the refractive index n and absorption coefficient K are co-directional relative to each other but arbitrarily directed (in the general case) relative to the X, Y, Z coordinate system associated with the substrate. The Z-axis is directed along the normal to the X, Y, Z-plane of the polarizer. The X-axis is pointing along the direction of movement of the substrate and the device, which applies the dyestuff film. The Y-axis is perpendicular to the XZ-plane. The direction of the X-axis is not necessarily coincident with the direction of the minor axis 3 of the ellipsoid. The minor axis is directed along the orientation of the major axes of the supramolecular complexes, which comprise the polarizing layer. These complexes are the structural units in lyotropic liquid-crystal state, existing in the solution. They are formed as the result of the molecular self-assembly. The major axis 1 is oriented along the direction of the orientation of the molecule's dipole moments of the optical transition. Moreover, the direction of these axes could vary in the different areas of the polarizer.

The absorption coefficient $K_3$ along the axis 3 is of minimal magnitude. In an ideal polarizer it should be zero. Axis 1 coincides with the direction, along which absorption coefficient $K_1$ is maximum. It is necessary to note that a decrease of $K_1$ will cause an increase of $K_2$, since it is related to the re-orientation of the dipole moments of optical transition from the distributed state to a single-orientation in the plane 1–2.

This will increase the polarizing efficiency, while maintaining the same thickness. For the components of the real and the imaginary parts of the refractive index the following should be true:

$$K_1 \geq K_2 > K_3$$

$$\frac{(n_1 + n_2)}{2} > n_3$$

Components of the real and imaginary parts of the anisotropic refractive index and the direction of the ellipsoid's axes could be experimentally determined with the existing ellipsometric and spectral photometric methods.

It is possible to provide the necessary anisotropy and the orientation of the main axes of the absorption coefficient by creating a certain angular distribution of molecules in the polarizing film on the substrate surface. If the function of the distribution is symmetric relative to the direction of the application of the polarizer and the normal to the substrate plane, then axes 1 and 3 will coincide with these directions, i.e. axes X and Z, while the Y-axis will be perpendicular to them. Then, the X-axis will be the axis of the minimal absorption, while Y-axis will be the axis of maximum absorption. With asymmetrical angular distribution the orientation of the axes may not coincide with the above directions.

Figure 4:
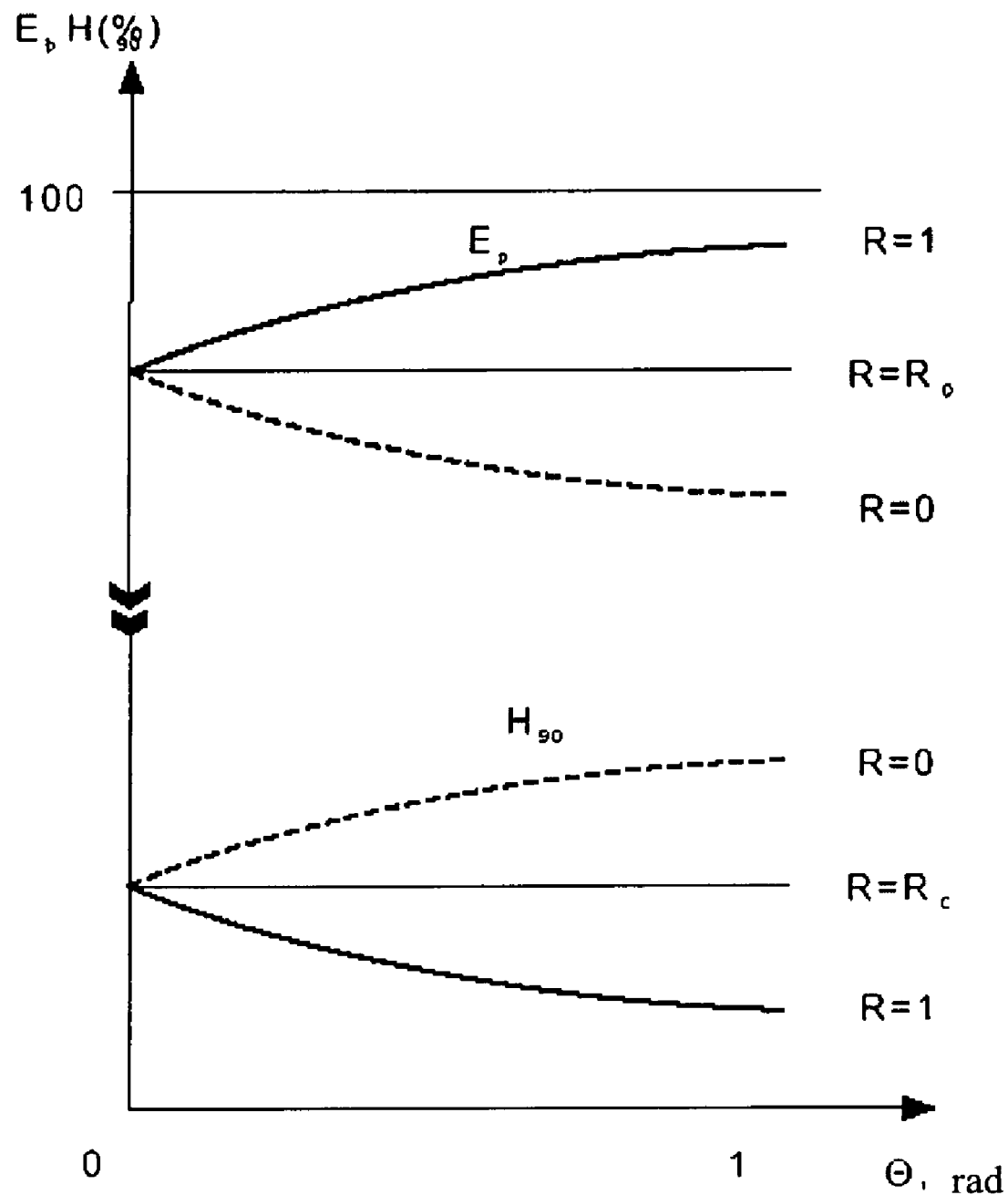
FIG. 4 is a graph showing the angular dependence of the polarizing efficiency Ep of a polarizer and transmittance $H_{90}$ by the two cross-oriented polarizers according to the present invention as a function of the polar angle, with the fixed incident azimuth angle of 45°.

FIG. 4 provides a plot of the angular dependence of polarizing efficiency Ep and transmission by two cross-oriented polarizers $H_{90}$ on the polar angle with fixed azimuth angle at 45° for various values of coefficient R, which is equal to the ratio of $K_2$ and $K_1$ in the range from 0 to 1. With R=0, the polarizing efficiency decreases, while transmission increases with the deviation of the beam from the normal to the polarizers. However, when $R=R_0$ the dependence reverses, i.e. the polarizing efficiency increases, while transmission decreases. This signifies an enhancement of angular characteristics, provided by the polarizers of the present invention.

Symmetrical and asymmetrical angular distribution of molecules can be obtained via different methods. FIG. 5 shows one example of a packing of molecules, the dipole moment of optical transition of which is directed along its major axis. With the formation of the polarizer the dipole moment appears oriented at an angle to the surface of the substrate. In case of ideal packing of molecules, shown in the figure, the major axis of the absorption coefficient will be directed at an angle to the polarizer surface.

Figure 7:
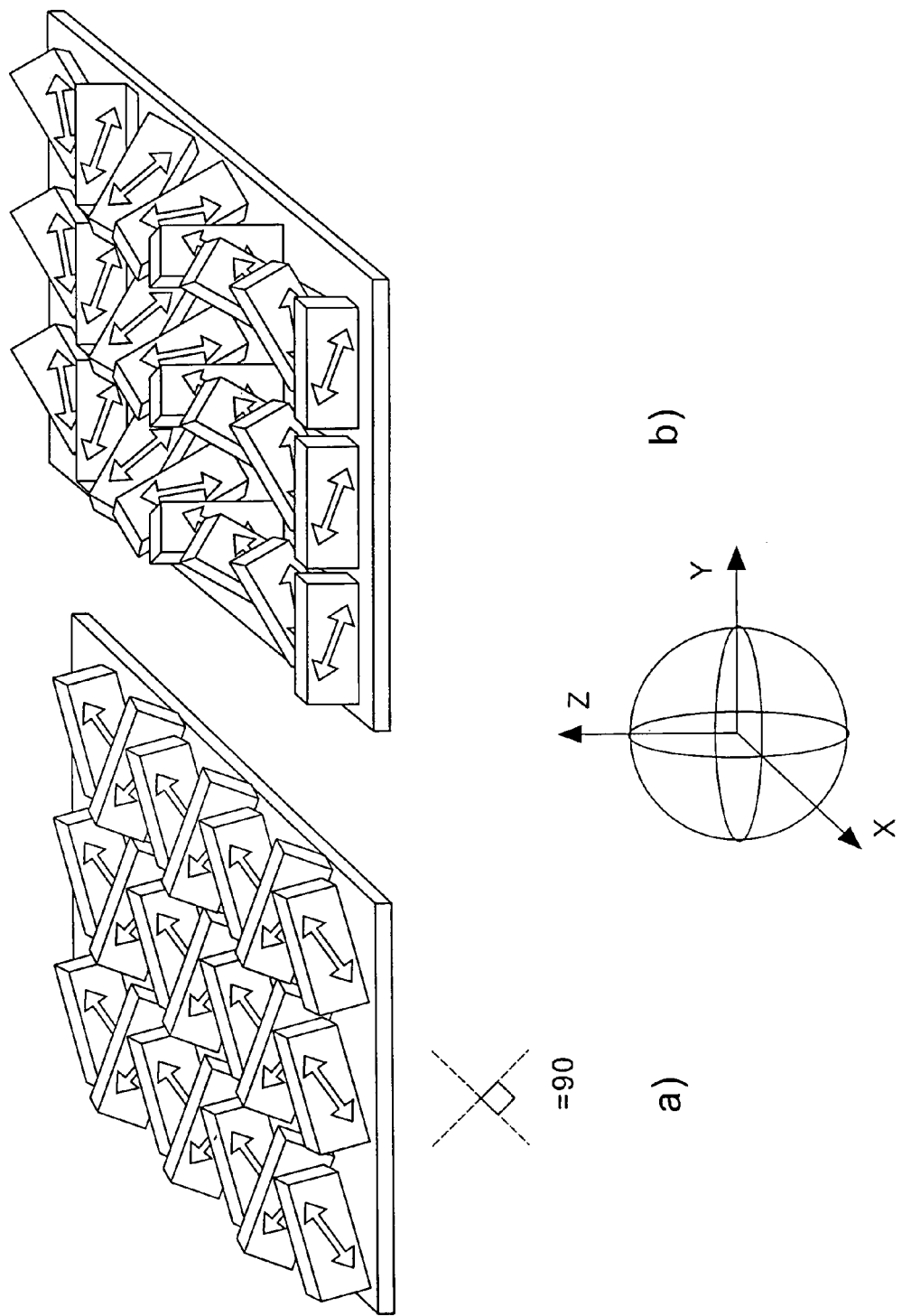

In the packing of molecules, shown in FIG. 6, a symmetrical distribution is achieved, where the major axes are directed normal, along and perpendicular to the plane of the molecules. In addition, the ratio of coefficients $K_y$ and $L_z$ depends on the angle between the direction of the dipole moment of the optical transition and the molecular axis. Thus, for example, if this angle is 45°, then they will be equal to each other (FIG. 7a), and if the angle is zero—then $K_z$ is also equal to zero. Obviously, the presence of the spiral axis perpendicular to the plane of the molecules will lead to equality of $K_y$ and $K_z$. This case is illustrated in FIG. 7b. Disturbance of the directional order increases absorption along the normal and makes the ellipsoid more symmetrical in the plane perpendicular to the direction of the orientation.

Figure 8:
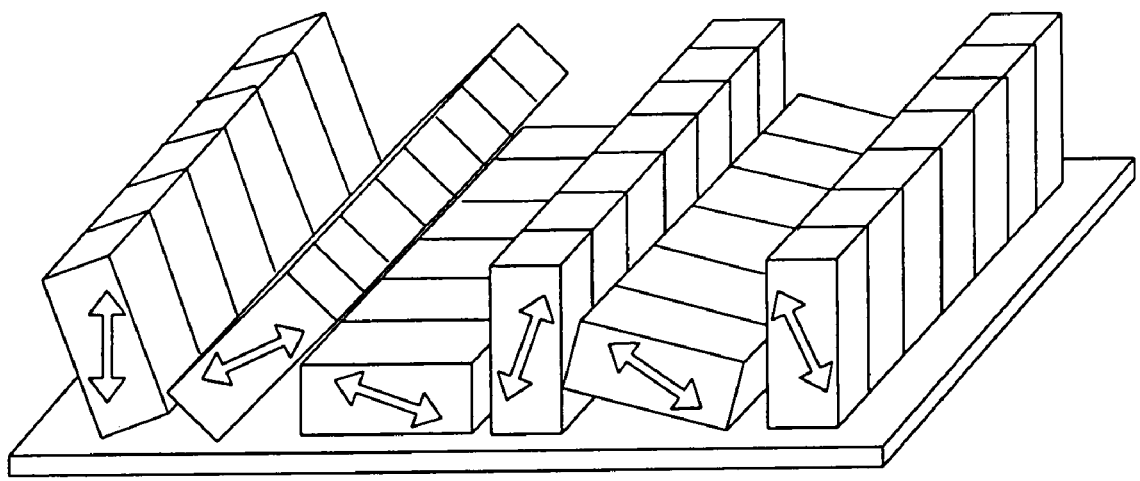
Figure 8:
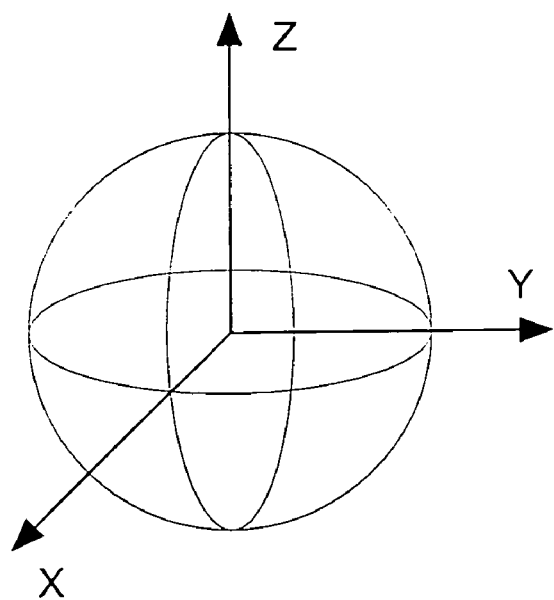
Figure 9:
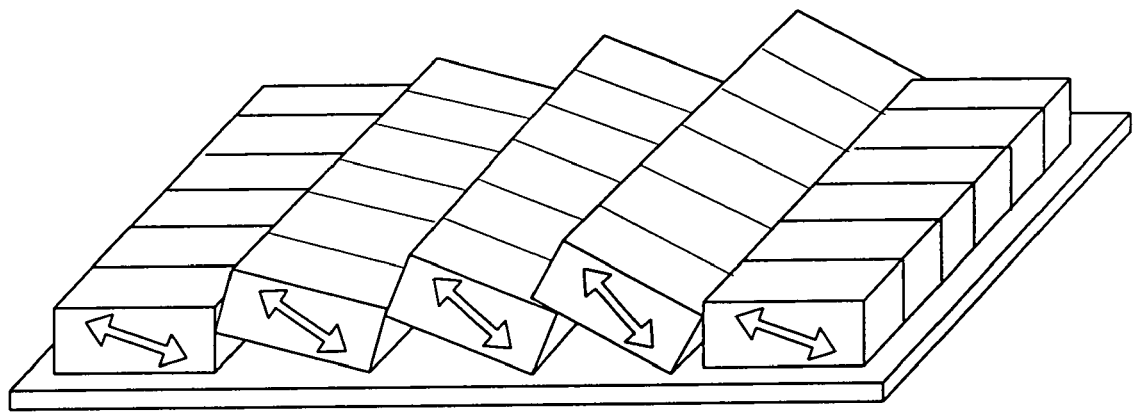
Figure 9:
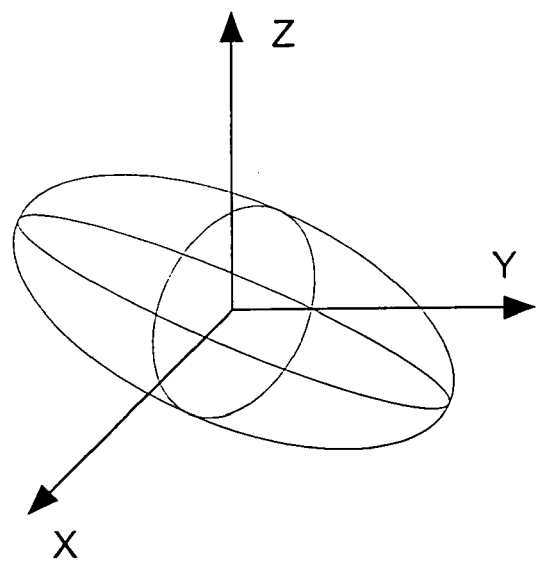

FIGS. 8 and 9 show symmetrical and asymmetrical cases, respectively, of angular distribution with the partial misalignment of the molecules in the plane perpendicular to the direction of the polarizer's application.

Control over the angular distribution of molecules, and consequently, over the ratio of the components in the anisotropic absorption coefficient and also the distribution of orientations of the major axes of ellipsoids in the volume of the polarizer could be conducted with various methods, such as any one of the following:

application of an external electric or magnetic field on the region where the polarizer is formed, forces of viscous flow, alteration of the surface properties via its modification, alteration of the surface energy and its anisotropy, certain conditions of the drying conditions during the process of the polarizer forming, modification of the organic molecules via insertion of additional groups or exchanging existing one for others, varying the ratio of the quantities of isomers in the composition of lyotropic liquid crystal, and other methods.

The minimum length of the film area, on which the mentioned parameters are under control, is determined by the lower limit of the working range of wavelengths for particular polarizer. A smaller structure will be averaged and will be impossible to detect via optical methods. The spectral range of polarizer's operation depends on the spectral range of the absorption bands of the organic molecules and lies in the range of about 0.2–13 μm, which includes ultra-violet, visible and infrared ranges.

Organic molecules of various kinds, which can form the liquid crystal and lyotropic liquid crystal phases, can be used to obtain the directionally and spatially ordered layer of organic matter. Examples of suitable organic molecules include: polymer liquid crystal (LC), LC with high melting temperature, low-molecular weight compounds, which in solution prone to aggregate and transition to lyotropic liquid-crystalline state. Most of the latter are the water-soluble dyestuffs, on the basis of which the polarizer with the necessary angular characteristics could be obtained.

Structural formulas of organic matters which are suitable for use in the present invention are illustrated below.

Dyestuffs:

polymethine dyestuffs, for example,

"pseudoisocyanine":

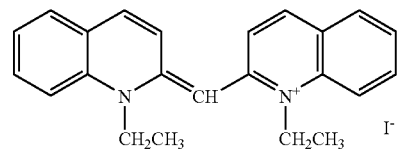

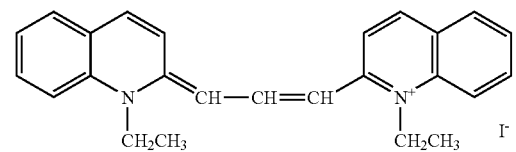

triarylmethane dyestuffs, for example,

"osnovnoi biriuzovii" (C.I. Basic Dye, 42035 (Turquoise Blue BB (By))):

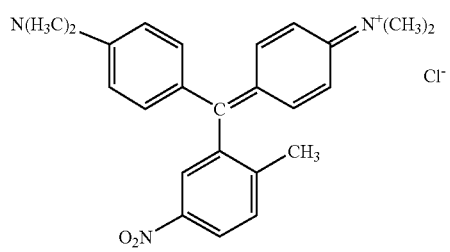

"kislotnii yarko-goluboi 3" (C.I. Acid Blue 1, 4204):

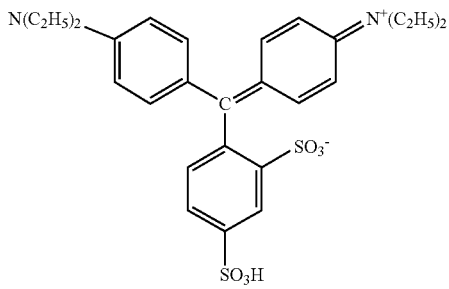

diaminoxanthene dyes, for example,
"slforhodamine S" (C.I. Acid Red 52, 45100 (Sulforhodamine B)):

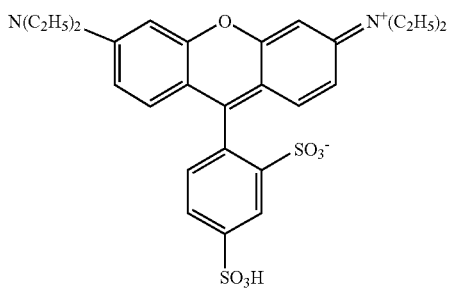

acridine dyes, for example,
"osnovnoi zholtii K" (C.I. Basic Dye, 46025 (Acridine Yellow G and T(L))):

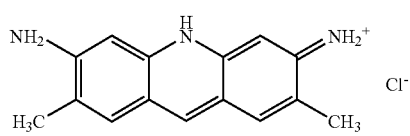

sulfonation products of acridine dyes, for example,
of "trans-quinacridone" (C.I. Pigment Violet 19, 46500 (trans-Quinacridone)):

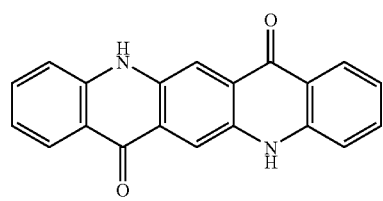

water-soluble derivatives of anthraquinone dyes, for example,

"aktivnii yarko-goluboi KH" (C.I. Reactiv Blue 4, 61205):

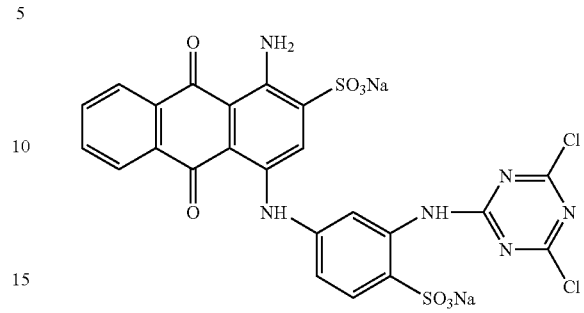

sulfonation products of vat dyes, for example,
of "flavantrone" (C.I. Vat Yellow, 1, 70600 (Flavanthrone)):

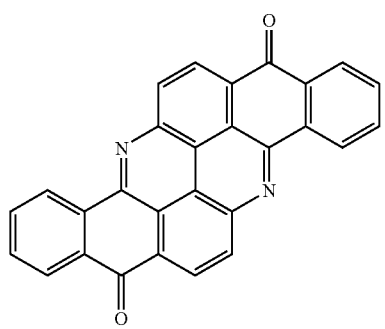

of "indantrenovii zholtii" (C.I. Vat Yellow 28, 69000):

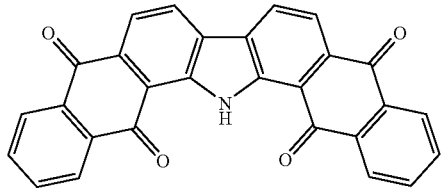

of "kubovii zholtii 4K" (C.I. Vat Orange 11, 70805):

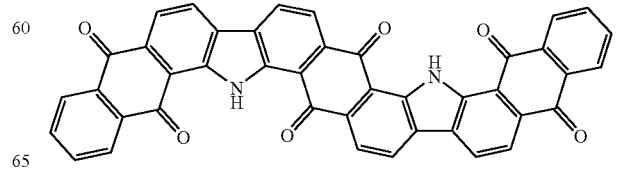

of "kubovii tyomno-zelenii Zh" (C.I. Vat Green 3, 69500):
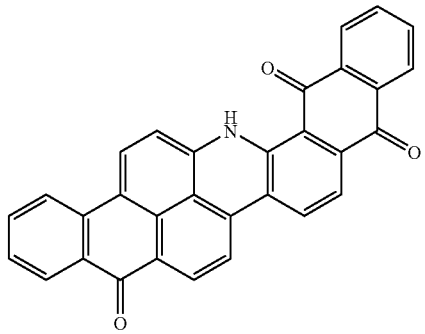
of "kubovii fioletovii S" (C.I. Vat Violet 13, 68700):
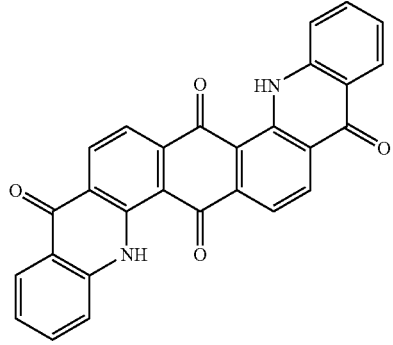
of indanthrone (C.I. Vat Blue 4, 69800 (Indanthrone)):
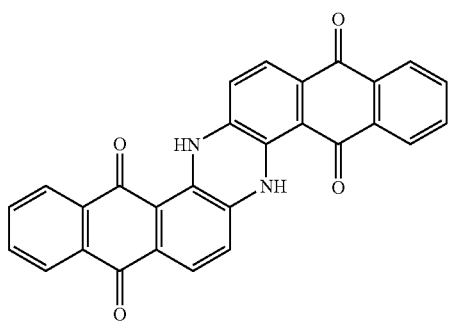
of perylene violet dye (CAS: 55034-81-6):
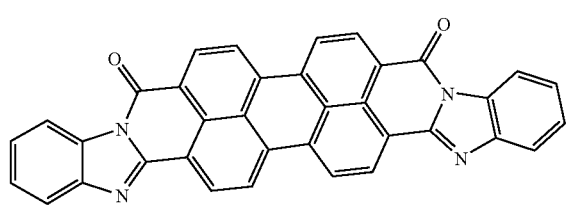
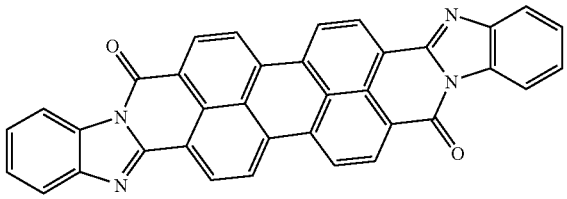
of "kubovii alyi 2Z" (C.I. Vat Red 14, 71110):
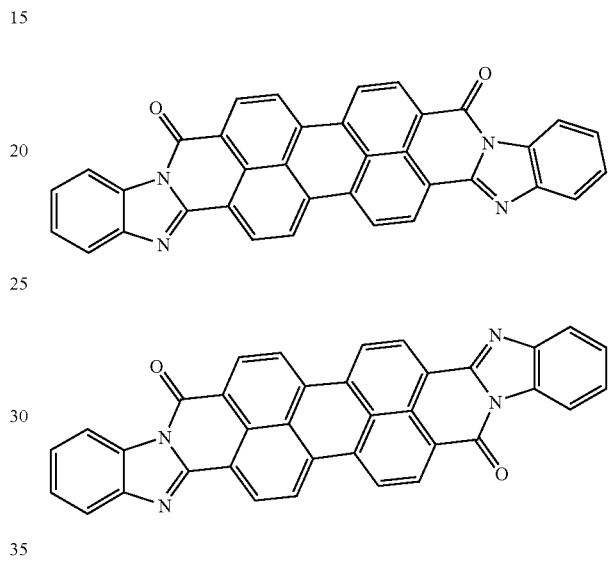
azo-dyes, for example,
Benzopurpurine 4B (C.I. Direct Red 2, 23500):
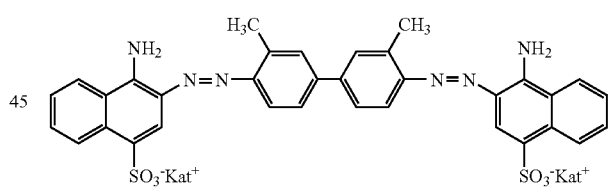
"Pryamoy zheltii svetoprochniy O":
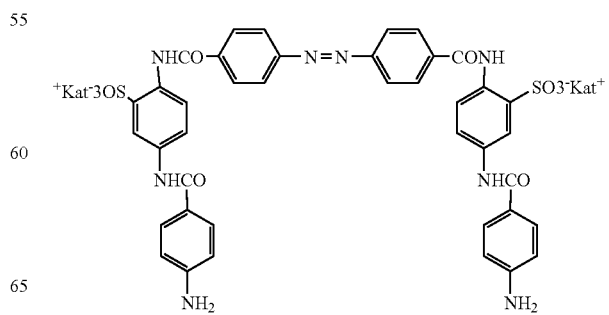

"Pryamoy zheltii svetoprochniy" (C.I. Direct Yellow 28, 19555):

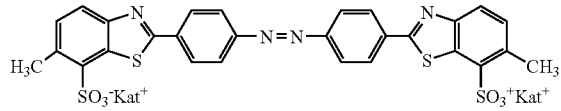

water soluble diazine dyes, for example,
"Kislotnii temno-goluboi Z" (C.I. Acid Blue 102, 50320):

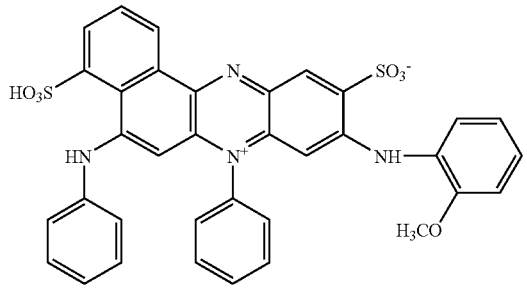

sulfonation products of dioxazine dyes, for example,
of "pigment fioletovii dioxazinovii" (C.I. Pigment Violet 23, 51319):

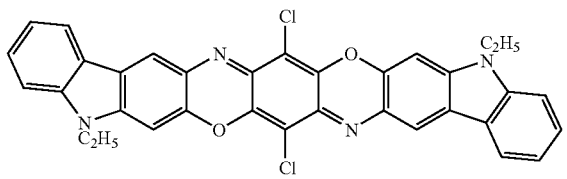

water-soluble thiazine dyes, for example,
C.I. Basic Blue 9, 52015 (Methylene Blue):

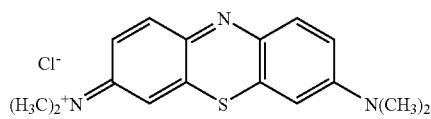

water-soluble derivatives of phtalocyanine dyes, for example, cupric octacarboxyphtalocyanine salts:

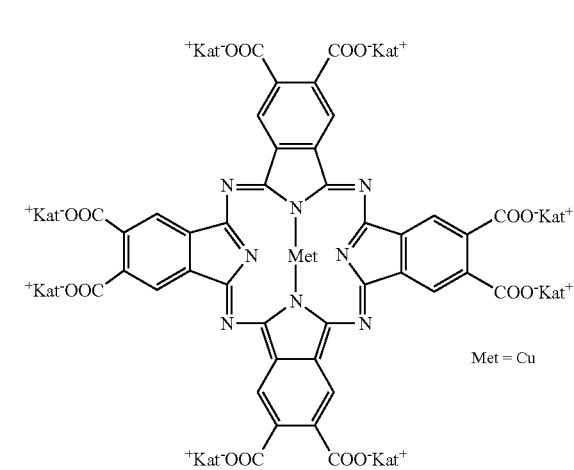

fluorescent bleaches, for example:

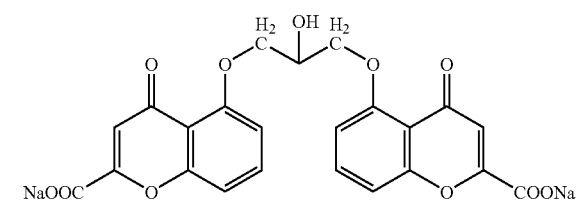

And also other colorless organic substances, for example di-sodium chromoglycate:

$$\frac{(n_1 + n_2)}{2} > n_3$$

A side from the polarizing layer and the substrate, which could be manufactured from a polymer, glass, metal, or of semiconducting material of flat, spherical, conical, cylindrical or other shapes, the polarizer may also include one or more conducting, insulating, birefringent, reflective, protective, adhesive and other layers, which provide the necessary properties and enhance technical characteristics of polarizers.

POLARIZER OPERATION EXAMPLE

Lets consider the operation of polarizer according to the present invention, absorption coefficients of which along the three axes are not equal and the absorption coefficient of the mean value is the one along the normal to the substrate plane. Due to polarizer's imperfections, coefficient $K_x$ is close but not equal to zero. Upon the incidence of an unpolarized beam of light normal to the polarizer's plane, the circumference of E-vectors (the circumference, which is formed by the tips of the electrical field vectors of the unpolarized beam) transforms into an ellipsoid with the lengths of axes determined by the polarizer thickness and absorption coefficients $K_x$ and $K_y$. The polarizer thickness is chosen such that the exiting light beam is linearly polarized. When the beam is diverged from the normal, the linear polarization will transform into partial polarization, characterized by the elliptic distribution of the electric field amplitude depending on the orientation of the polarization plane in the beam. Also, the speed of change of the major and minor axes depending on the polar and azimuth angle of propagation are not equal and depend on the ratio of the coefficients $K_y$ and $K_z$, which is set so as to provide the optimum combination of the intensity and degree of polarization of the passing light. In particular, one of the conditions for optimum performance would be to at least maintain the level of polarizing efficiency upon divergence of the beam from the normal and azimuth angle of 45°. The optimum is calibrated according to the transmission of two cross- and parallel-oriented polarizers at least for one wavelength.

REALIZATION OF THE INVENTION.
EXAMPLE

Dichroic polarizers according to the present invention are obtained via formation of at least one anisotropically absorbing film comprised of oriented molecules of organic matter. The material of the mentioned film can be obtained via one of the known methods. One of the above listed compounds is used, for example indanthrone. Then the dyestuff is transformed into the liquid crystal (LC) solution. The obtained LC solution is applied onto a glass plate (10×10 cm$^2$) in the form of a strip and on the distance of 2 cm from the edges of the plate. The plate is fixed on the linearly moving stage. Non-rotating roller of 2-cm diameter is pressed against the plate. The desired dyestuff solution film thickness is controlled by the two spacers, which are fixed on the roller. The stage with the fastened plate is moved with the speed of 10 cm/sec. The film is dried at room temperature. The orientation of the supramolecular complexes from the LC solution is controlled by varying the external alignment force in the process and/or after the film formation. The external alignment force can be different: electromagnetic, mechanical, etc. With the necessary intensity of the external alignment force, which is determined by the properties of a particular LC solution (chemical content, concentration, temperature, etc.), the anisotropically absorbing film, characterized by parameters mentioned in the independent claims is obtained.

As indicated by the experimental data, dichroic polarizers obtained according to the present invention provide enhancement of the angular characteristics, in particular, the increase of transmission of unpolarized light by one as well as two parallel polarizers, while retaining their thickness and the enhancement of the angular characteristics of two cross-oriented polarizers and an increase of their polarizing efficiency. For all obtained polarizers, the polarizing efficiency was no less than 98.8%, while the transmittance of unpolarized light by a single polarizer was higher than the regular polarizer of the same thickness.

The foregoing description of specific embodiments and examples of the invention have been presented for the purpose of illustration and description, and although the invention has been illustrated by certain of the preceding examples, it is not to be construed as being limited thereby. They are not intended to be exhaustive or to limit the invention to the precise forms disclosed, and obviously many modifications, embodiments, and variations are possible in light of the above teaching. It is intended that the scope of the invention encompass the generic area as herein disclosed, and by the claims appended hereto and their equivalents.

We claim:
1. A dichroic polarizer, comprising:
   at least one anisotropically absorbing film of oriented molecules of an organic matter, and the absorbing film is characterized by an absorption band of absorption wavelengths;
   wherein the molecules are oriented such that in at least one band of absorption wavelengths ellipsoids defining an anisotropic refractive index of the absorbing film are present wherein:

$K_1 \geq K_2 > K_3$ and $$\frac{(n_1 + n_2)}{2} > n_3$$

where, $K_1$, $K_2$, $K_3$ are the absorption coefficients and $n_1$, $n_2$, $n_3$, are the refractive indices, respectively, along the major axes of the ellipsoids.

2. The polarizer according to claim 1 wherein the following is true for the absorption coefficients:

$K_1 \geq K_2 >> K_3$ and $K_3 \approx 0.2\ K_1$.

3. The polarizer according to claim 1 further comprising a substrate and the anisotropically absorbing film is supported on the substrate and wherein the axis corresponding to the maximum value of $K_1$, $K_2$, $K_3$ lies in a plane parallel to the surface of the substrate.

4. The polarizer according to any of claim 1 or 2, wherein the organic matter is comprised by at least one organic substance, chemical formula of which has at least one ionogenic group, which provides its solubility in polar solvents in order to create a lyotropic liquid-crystal phase, and/or at least one non-ionogenic group, which provides solubility in non-polar solvents in order to create a lyotropic liquid-crystal phase, and/or at least one counterion.

5. The polarizer according to any of claim 1 or 2, wherein the organic matter is embodied by at least one organic dyestuff capable of light absorption in at least one of the following spectral ranges: from 200 through 400 nm, or from 400 through 700 nm, or from 0.7 through 13 μm.

6. The polarizer according to any of claim 1 or 2, wherein the organic matter is embodied by at least one organic dyestuff of the formula {K}(M)n where K—is a dyestuff, chemical formula of which contains an ionogenie group or several groups, same or different, which provide its solubility in polar solvents in order to form a lyotropic liquid-crystal phase, M—is a counterion, and n—is the number of counterions in a dyestuff molecule, which can be a fraction in the case of sharing of one counterion by several molecules, and in the case of n>1 the counterions can be different.

7. The polarizer according to claim 1 wherein the anisotropically absorbing film is formed by supra-molecular complexes of one or more organic substances, and the supra-molecular complexes are oriented in a particular direction in order to polarize incident light.

8. The polarizer according to any of claim 1 or 2, wherein at least one anisotropically absorbing film is formed with use of a solution of at least one organic matter which can form a stable lyotropic or thermotropic liquid-crystal phase, via application of said solution onto an isotropic or anisotropic substrate surface, alignment action and subsequent drying process.

9. The polarizer according to any of claim 1 or 2, wherein the polarizer further comprises a substrate made from a polymer, glass, metal or semiconductor.

10. The polarizer according to any of claim 1 or 2, wherein the polarizer further comprises one or more films selected from the group consisting of polarizing film, conducting film, phase-shifting film, birefringent film, alignment film, protecting film, liquid-crystal film, diffuse- or mirror-reflecting film, and film operating as at least two or more of the above listed films, wherein at least one of those films is anisotropically or isotropically absorbing and/or birefringent.

11. The dichroic polarizer of claim 1, further comprising a substrate and the anisotropically absorbing film is supported on the substrate and wherein the axis corresponding to a minimum value of $K_1$, $K_2$, and $K_3$ lies in a plane parallel to the substrate.

12. The dichroic polarizer of claim 1 wherein the molecules are ordered into a crystalline structure.

13. A material of an anisotropically absorbing film having oriented molecules of an organic matter comprising:

the molecules oriented so that for the major axes of ellipsoids the real and imaginary parts of an anisotropic refractive index in the range of at least one band of absorption wavelengths, the following relationship is true:

$K_1 \geq K_2 > K_3$ and $$\frac{(n_1 + n_2)}{2} > n_3$$

where $K_1$, $K_2$, $K_3$ are absorption coefficients and $n_1$, $n_2$, $n_3$, are the refractive indices, respectively, of the major axes of the ellipsoids representing the anisotropic refractive index.

14. The material according to claim 13 wherein the following is true for the absorption coefficients:

$K_1 \geq K_2 >> K_3$ and $K_3 < 0.2\, K_1$.

15. The material according to claim 13 or 14 wherein the organic matter is embodied by at least one organic substance, chemical formula of which contains at least one ionogenic group, which provides solubility in polar solvents in order to create a lyotropic liquid-crystal phase, and/or at least one non-ionogenic group, which provides solubility in non-polar solvents in order to create a lyotropic liquid-crystal phase, and/or at least one counterion.

16. The material according to claim 15 wherein the polar solvent is water.

17. The material according to claim 13 or 14 wherein the organic matter is embodied by at least one organic dyestuff of the formula {K}(M)n where K—is a dyestuff, chemical formula of which contains an ionogenic group or several groups' same or different which provide its solubility in polar solvents in order to form a lyotropic liquid-crystal phase, M—is counterion, and n—is the number of counterions in a dyestuff molecule, which can be a fraction in the case of sharing of one counterion by several molecules, and in the case of n>1 the counterions can be different.

18. The material according to claim 13 or 14 wherein the organic matter is embodied by at least one organic dyestuff capable of absorption in at least one of the following spectral ranges: from 200 through 400 nm, or from 400 through 700 nm, or from 0.7 through 13 μm.

19. The material according to claim 13 wherein the film is formed by supra-molecular complexes of one or more organic substances, and the supra-molecular complexes are oriented in a particular direction in order to polarize incident light.

20. The material according to claim 13 or 14 wherein the film is obtained from a solution of at least one organic matter, which forms a stable lyotropic or thermotropic liquid-crystal phase, via application of said solution onto an isotropic or anisotropic surface of a substrate, application of an external alignment force and subsequent drying process.

21. The material according to claim 13 or 14 which is used for obtaining a polarizing film, phase-shifting film, birefringent film, an alignment film, a protective film, liquid-crystal film, or a film operating as any combination of at least two of said films.

22. The material according to claim 13 wherein the material is characterized by varying direction of polarization throughout the thickness and at least on one region of a film obtained from it.

23. The material of claim 14, wherein the film is formed by supra-molecular complexes of one or more said organic matter, and the supra-molecular complexes are oriented in a particular direction in order to polarize incident light.

24. The material of claim 13 wherein the molecules are ordered into a crystalline structure.

* * * * *